United States Patent Office 2,703,320
Patented Mar. 1, 1955

2,703,320

CHEMICAL COMPOUNDS AND PROCESSES OF PREPARING THE SAME

Dale N. Robertson, Madison, and Karl Paul Link, Middleton, Wis., assignors to Wisconsin Alumni Research Foundation, Madison, Wis., a corporation of Wisconsin No Drawing. Application October 9, 1953, Serial No. 385,295

2 Claims. (Cl. 260—240)

The present invention relates to new chemical compounds and processes of preparing the same. The compounds are reaction products of 4-hydroxycoumarin and are of interest in the anti-coagulant field. The following examples will serve to illustrate the invention.

EXAMPLE I

3 - methylene - [3' - (4' - hydroxycoumarinyl)] - 2,4-diketochroman(I)

A mixture of 30 g. of ethyl orthoformate, 16.2 g. of 4-hydroxycoumarin and 20 g. of acetic anhydride in a 250 ml. round bottom flask fitted with a reflux condenser was heated in an oil bath at 120° C. for one-half hour. As the solid dissolved the mixture became bright yellow in color and shortly after complete solution had occurred a yellow solid begin to separate. At the end of one-half hour the flask was cooled, the product was filtered, washed with abslute ethyl acetate and air dried, giving a bright yellow amorphous solid, M. P. 214° C. (dec). Recrystallization from ethyl acetate or acetic acid raises the melting point to 215° C. (dec.).

The condensation of the alkyl (methyl, ethyl, etc.) orthoformate with the 4-hydroxycoumarin to produce the diketochroman(I) product instead of the expected ethoxymethylene compound, was confirmed by reduction to 3,3'-methylenebis - 4 - hydroxycoumarin known in the art as Dicumarol. As this can be readily done by catalytic reduction using perviously reduced Adams catalyst (PtO₂) in dioxane, the diketochroman(I) product of Example I can be employed as an intermediate for use in the preparation of the anticoagulant Dicumarol.

EXAMPLE II 3,3',3''-tri(4-hydroxycoumarinyl)methane epoxide(II)

A mixture of 2.2 g. of the diketochroman(I) product of Example I and 1.62 g. of 4-hydroxycoumarin in 25 ml. of pyridine was first refluxed for about fifty minutes. Some solid separated during this reaction period. The mixture was then cooled, filtered and the solid washed with ethyl acetate until colorless. The desired product was obtained as colorless crystals, M. P. 336–337° C. (dec.). The product of Example II has anticoagulant properties and is of interest where a product of relatively low activity is desired.

The diketochroman product (I) of Example I may be illustrated by the following formula:

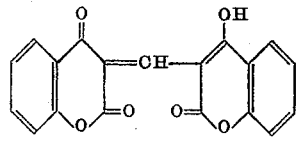

The epoxide product (II) of Example II may be illustrated by the following formula:

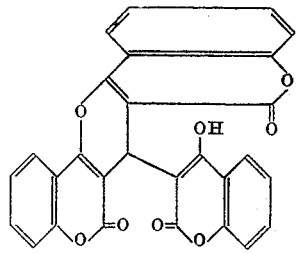

We claim:
1. Products selected from the group consisting of 3-methylene - 3' - (4' - hydroxycoumarinyl) - 2,4 - diketochroman and 3,3',3''-tri(4-hydroxycoumarinyl) methane epoxide.
2. The process of preparing the compounds of claim 1, which comprises condensing 4-hydroxycoumarin with an alkyl orthoformate in the presence of acetic anhydride, and then reacting the resulting diketochroman intermediate with 4-hydroxycoumarin in the presence of pyridine and recovering the resulting epoxide compound from the reaction mixture.

References Cited in the file of this patent

UNITED STATES PATENTS

| | | |
|---|---|---|
| 2,642,441 | Seidman et al. | June 16, 1953 |
| 2,650,233 | Seidman et al. | Aug. 25, 1953 |

OTHER REFERENCES

Sullivan et al., J. A. C. S. 65, pp. 2285–2891 (1943).